United States Patent [19]

Bullivant et al.

[11] 4,275,808
[45] Jun. 30, 1981

[54] INTERCHANGEABLE VOLUMETRIC SCREW FEEDER

[75] Inventors: Kenneth W. Bullivant, Millville, N.J.; Hermann Schreier, Lenzburg, Switzerland

[73] Assignee: K-Tron International Inc., Scottsdale, Ariz.

[21] Appl. No.: 15,698

[22] Filed: Feb. 27, 1979

Related U.S. Application Data

[63] Continuation of Ser. No. 811,105, Jun. 29, 1977, abandoned.

[51] Int. Cl.³ .................... B65G 33/18; B65G 47/18
[52] U.S. Cl. .................................. 198/533; 198/548; 198/558; 198/625; 198/662; 222/238; 222/413
[58] Field of Search .............. 198/548, 616, 625, 662, 198/674, 558, 533; 222/238, 252, 413

[56] References Cited

U.S. PATENT DOCUMENTS

| | | | |
|---|---|---|---|
| 854,165 | 5/1907 | Hodge | 222/413 X |
| 2,288,849 | 7/1942 | Schwitzer | 198/674 X |
| 2,395,410 | 2/1946 | Kaesler | 198/674 |
| 2,657,120 | 10/1953 | Bigsby et al. | 198/625 X |

*Primary Examiner*—Jeffrey V. Nase
*Attorney, Agent, or Firm*—Seidel, Gonda, Goldhammer & Panitch

[57] ABSTRACT

A volumetric screw feeder is interchangeably convertible from a twin screw feeder to a single screw feeder without modification of the gearing or drive means. The change from twin screw feeder to single screw feeder is made by interchanging the screws and the feeder hopper. Moreover, the drive shafts for all of the screws are brought out through a unitary seal.

6 Claims, 8 Drawing Figures

… …

INTERCHANGEABLE VOLUMETRIC SCREW FEEDER

This application is a continuation, of application Ser. No. 811,105, filed June 29, 1977 now abandoned.

This invention relates to an interchangeable volumetric screw feeder. More particularly, this invention relates to a volumetric screw feeder which can be changed from a twin screw feeder to a single screw feeder (or vice versa) simply by interchanging the screws and the feeder-hopper. The change is made without in any way having to modify the internal operating structure of the feeder such as the gearing.

Both single and twin screw volumetric feeders have been in public use for some time. In general, all volumetric screw feeders feed bulk material from a hopper or other storage means at selected volumetric rates. The rate is determined by a number of factors, but the principal factors are the pitch, diameter and rate of rotation of the screw. When precise volumetric feed rates are desired, other factors are applicable. These additional factors include the flow characteristics of the type of material that is to be fed. Certain difficult to flow materials tend to collect on a single auger screw and highly floodable materials tend to fall through a single screw. The use of twin screws resolves these problems by reason of their reciprocal wiping action and by providing a positive displacement for the materials. Hence, twin screws have the advantage of being capable of feeding a much broader range of materials. Notwithstanding this, there are some advantages to a single screw volumetric feeder including the fact that a larger number of screws can be used to provide a broad range of flow rates.

Therefore, in order to increase the flexibility of a volumetric screw feeder, it is desirable that it be capable of using both twin screws and a single screw. The present invention provides a volumetric screw feeder that it is interchangeable between twin screw feeding and single screw feeding. More particularly, the present invention provides an interchangeable twin screw to single screw volumetric feeder that is capable of being changed without having to modify or change the internal functions of the motor and drive for the screw feeder. It is only necessary to exchange the screws and the feeder-hopper in order to make the conversion.

In addition to the foregoing, the drive shafts for both the twin screws and the single screw are brought out adjacent to each other and in the same location on the volumetric screw feeder. It is necessary to provide a seal at this point for the purpose of preventing the backflow of material being fed into the internal operating parts of the screw feeder. In accordance with the present invention, all of the drive shafts for the screws are sealed by a single seal.

Other advantages and invention objects will appear from what is described hereinafter.

For the purpose of illustrating the invention, there is shown in the drawings a form which is presently preferred; it being understood, however, that this invention is not limited to the precise arrangements and instrumentalities shown.

Referring now to the drawings in detail, wherein like numerals indicate like elements, there is shown in FIG. 1 a perspective view of an interchangeable volumetric screw feeder set up in its twin screw function and designated generally as 10.

Figure 1:
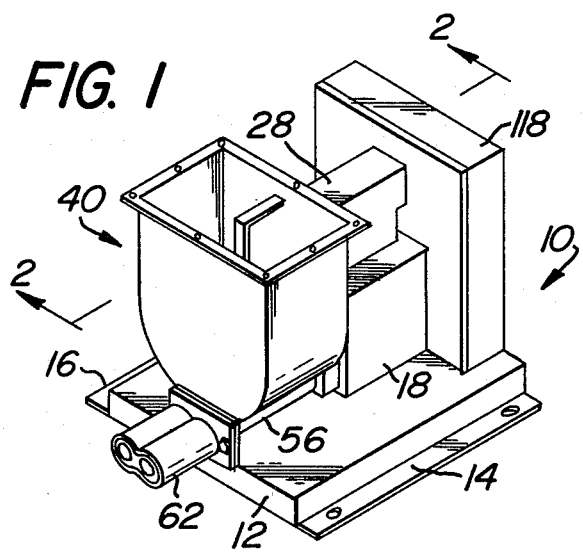
FIG. 1 is a perspective view of the interchangeable volumetric screw feeder set up as a twin screw feeder.

The screw feeder 10 includes a base 12 having protruding lateral flanges 14 and 16 for fixedly mounting the same to a supporting surface. The base 12 supports a gear box 18 which houses a series of interconnected gears for providing the drive means for operatively interconnecting the motor 20 with the screw drive shafts 22, 24 and 26.

Mounted on top of the gear box 18 is a bearing housing 28 which supports the bearings 30 and 32 which in turn rotatively support the agitator drive shaft 34. The agitator drive shaft 34 extends through the outer wall 36 of the bearing housing 28. Wall 36 forms a seal housing for the seal 38 which prevents the flow of material from the feeder hopper 40 back into the bearing housing 38.

Figure 2:
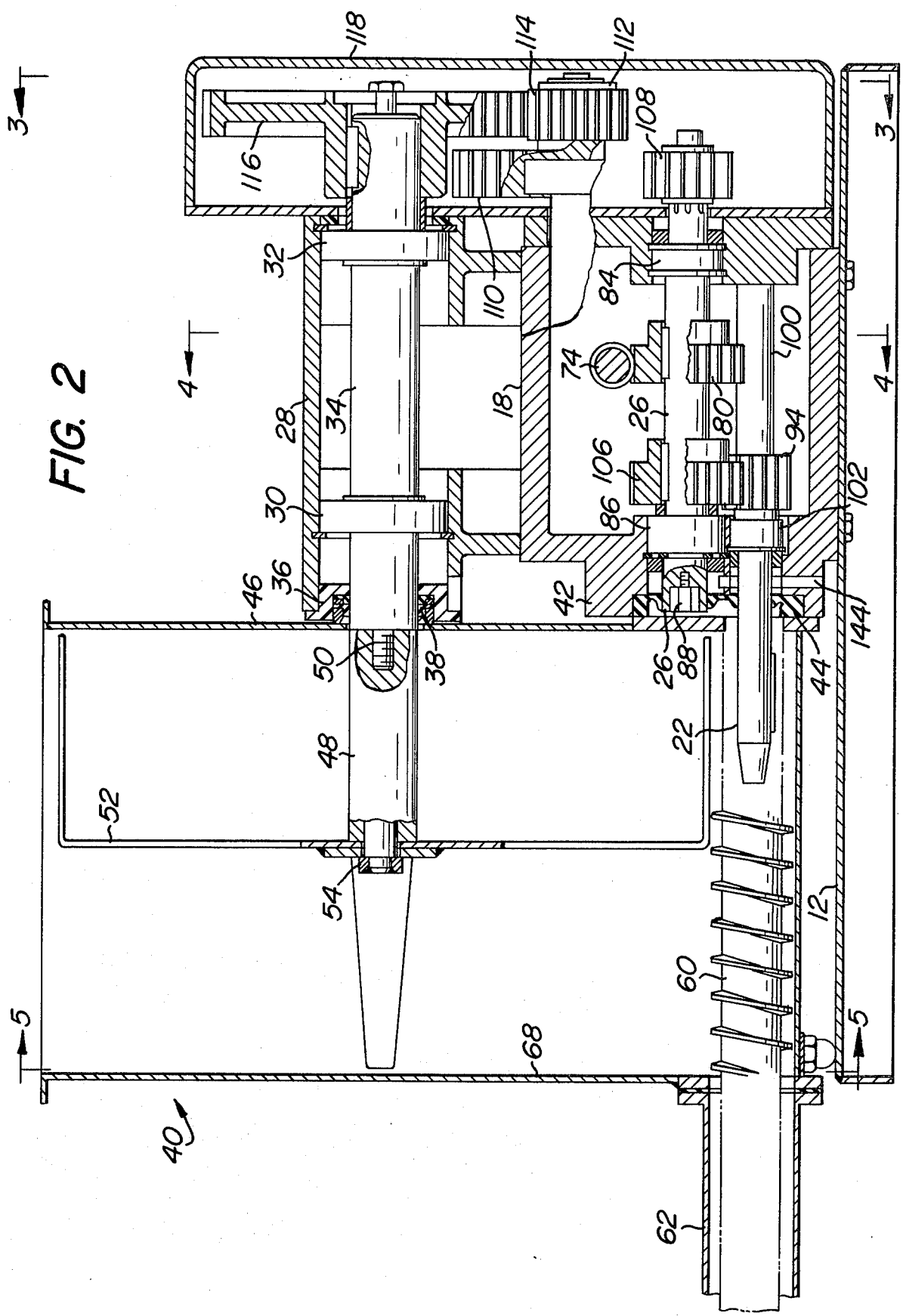
FIG. 2 is a longitudinal sectional view of the screw feeder taken along the line 2—2 in FIG. 1.

As best shown in FIG. 2, the feeder hopper 40 is positioned with its rearmost face flush against wall 36 and against the parallel and aligned surface of wall 42 of gear box 18 which also is recessed to provide a seal housing for seal 44 whose function is explained below. Feeder-hopper 40 is held in this position by a pair of overcenter locking devices (not shown) mounted on the vertical sides of the bearing housing 28. The overcenter locking devices engage D rings attached to the rearmost wall 46 of the feeder-hopper 40.

Stub shaft 48 is removably fixed to agitator drive shaft 34 by threaded fastener 50. Stub shaft 48 serves to support the agitator 52 which is removably mounted to stub shaft 48 by means of the hex head bolt 54. The agitator 52 rotates within the feeder-hopper 40 and assures the even, complete flow of material into the screws 58 and 60.

Figure 5:
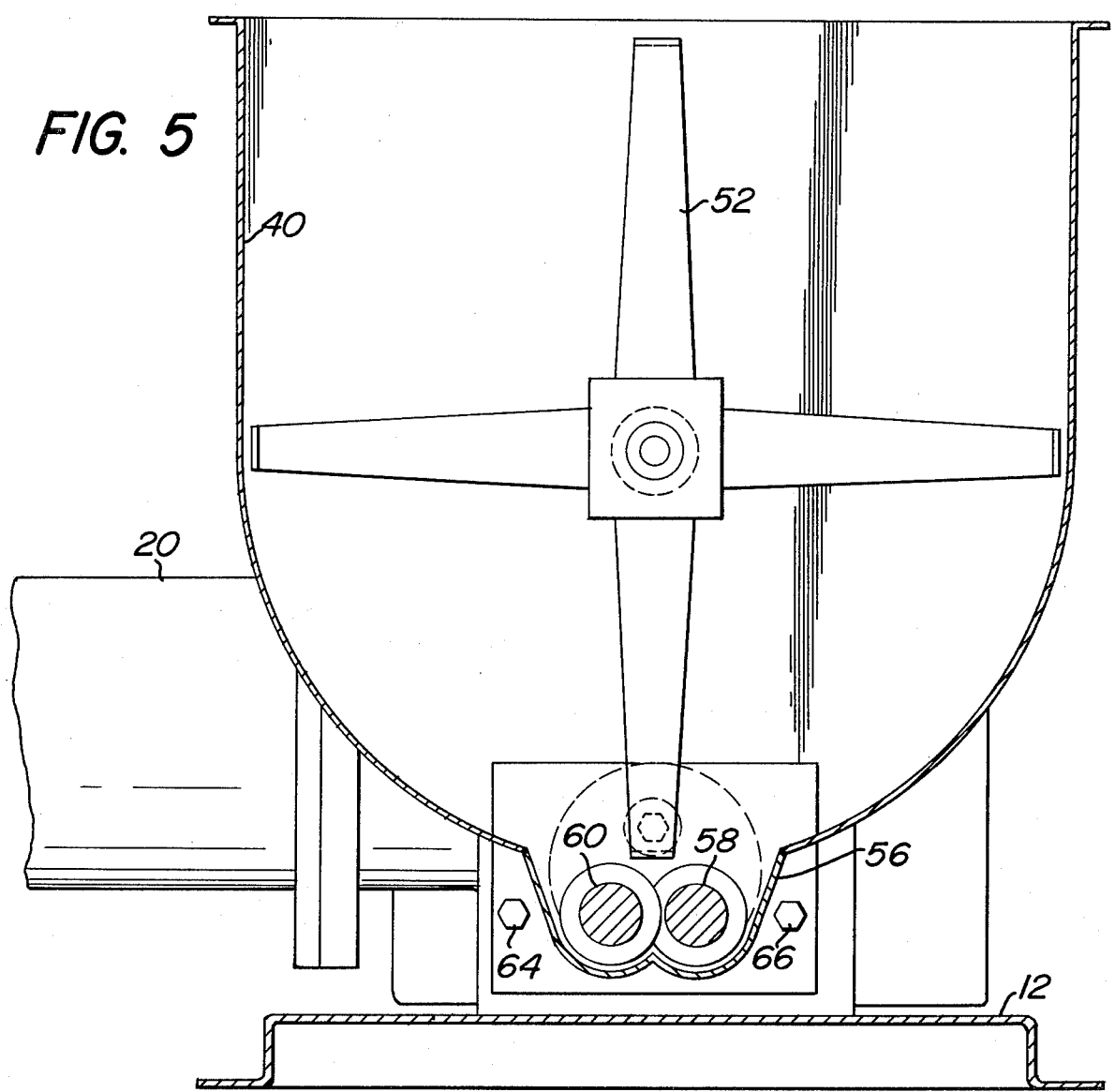
FIG. 5 is a transverse sectional view of the screw feeder taken along the line 5—5 in FIG. 2.

The base of hopper 40 is shaped to provide a trough 56 as best shown in FIG. 5. Material contained within the feeder-hopper 40 flows downwardly into the trough 56 where it is engaged by the intermeshed twin screws 58 and 60 mounted on the screw drive shafts 24 and 22, respectively. Screws 58 and 60 are mounted on screw drive shafts 22 and 24 by means of bayonet locks which permit them to be mounted by simply sliding them into position and then locking them by a simple twisting action. Screws 58 and 60 rotate together and are intermeshed so as to provide a reciprocal wiping action as well as a conveying action.

The trough 56 forms the lowermost portion of the feeder-hopper 40 and it is shaped so that its bottommost portion closely follows the contour of the screws 58 and 60. By thus positioning the screws 58 and 60 in the lowermost portion of the feeder-hopper 40, it is possible to substantially completely empty the hopper of the material to be fed.

Material to be fed from the hopper is conveyed through the outlet port 62 which is fixed by hex head bolts 64 and 66 to the wall 68 of the feeder hopper 40. Outlet port 62 may be interconnected, as desired, to subsequent material processing or handling equipment. The volumetric screw feeder 10 is fully capable of functioning in production processes either as a prefeeder or final feeder.

Motor 20 is preferably a D-C motor with a thyristor speed control unit for providing screw speed control over a wide range of velocities.

Figure 4:
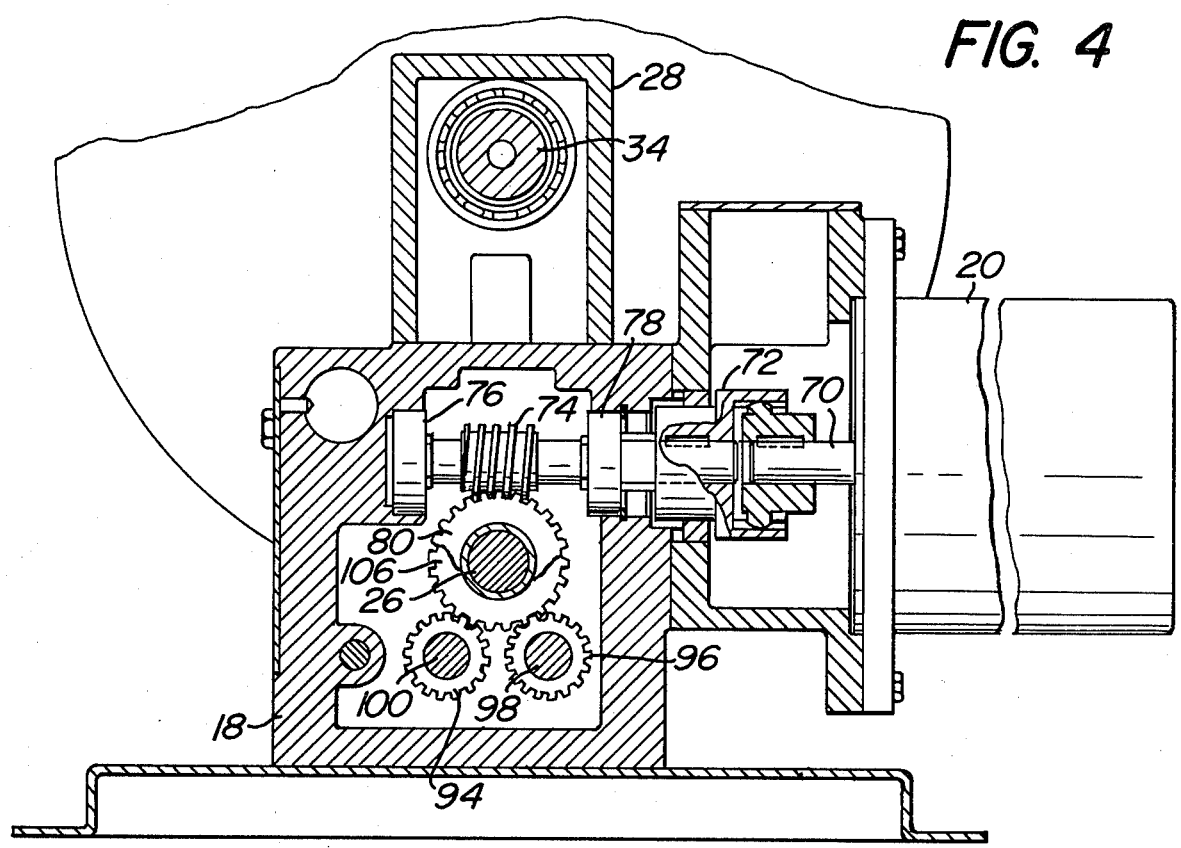
FIG. 4 is a transverse sectional view of the screw feeder taken along the line 4—4 in FIG. 2.

As best shown in FIG. 4, the output shaft 70 of motor 20 is coupled by an adaptor 72 to the worm gear 74 mounted on bearings 76 and 78 within the gear box 18. Worm gear 74 turns spiral tooth gear wheel 80 which is fixed to shaft 26 by a key or other appropriate means. Shaft 26 is rotatatively mounted by bearings 84 and 86 on the walls of the gear box 18. Shaft 26 terminates flush with the outermost face of wall 42 and is provided with a hexagonal recess 88 for receiving a stub shaft 90 for the single screw (see FIG. 6).

Pinion 106 is fixed to shaft 26 by a key or other appropriate means. Pinion 106 drives meshing pinions 94 and 96 which are fixed on the shafts 98 and 100 by keys or other appropriate means. Shafts 98 and 100 are rotatively mounted by bearings, such as the bearings 102 in wall 42. Shafts 98 and 100 are fixed to screw drive shafts 24 and 22, respectively, or, if desired, such screw drive shafts may be an integral part of shafts 98 and 100.

Thus, shaft 26 is driven and through the above-described gearing drives shafts 98 and 100 and hence the screws mounted on the screw drive shafts 22, 24 and 26.

Figure 3:
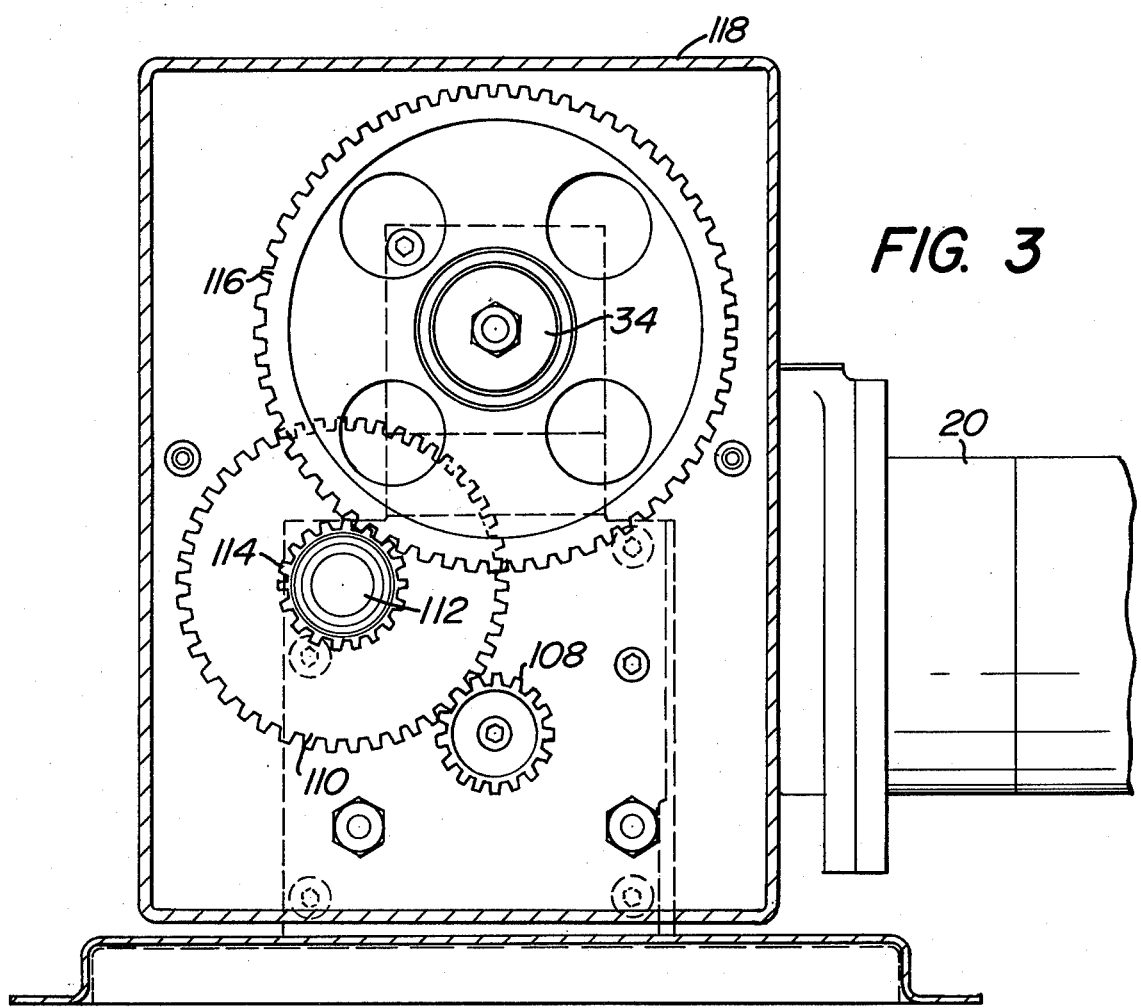
FIG. 3 is a transverse sectional view of the screw feeder taken along line 3—3 in FIG. 2.

The drive mechanism for the agitator 52 is provided in the following manner. A pinion 108 is splined to shaft 26. As best shown in FIG. 3, pinion 108 meshes with pinion 110 mounted on stub shaft 112. Also mounted on stub shaft 112 is pinion 114 which meshes with pinion 116 which is keyed or otherwise fixed on shaft 34. Shaft 34 rotates the agitator 52. Pinions 108, 110, 114 and 116 are protected by removable cover 118.

To change the operation of volumetric screw feeder 10 from that of a twin screw feeder to a single screw feeder, it is only necessary to remove the feeder hopper 40 and its associated agitator 52. Thereafter, the twin screws 58 and 60 are removed from the stub shafts 22 and 24 and the screw feeder 10 is ready to receive a single screw and feeder hopper. The agitator 52 is readily removed with the hopper 40 by loosening the bolt 54.

The screw feeder 10 is readied to receive a single screw 120 by positioning the stub shaft 90 within the hexagonal recess 88 and locking it in position with the threaded fastener 122. Screw 120 then is fixed on stub shaft 90 by a bayonet connection. Thereafter, the feeder hopper 124 is slid into position over the screw 120 and locked in place using the aforesaid described overcenter fastening devices and D rings on the feeder hopper 124. The agitator 126 is bolted to the stub shaft 48 in the same manner as agitator 52 is mounted.

Figure 7:
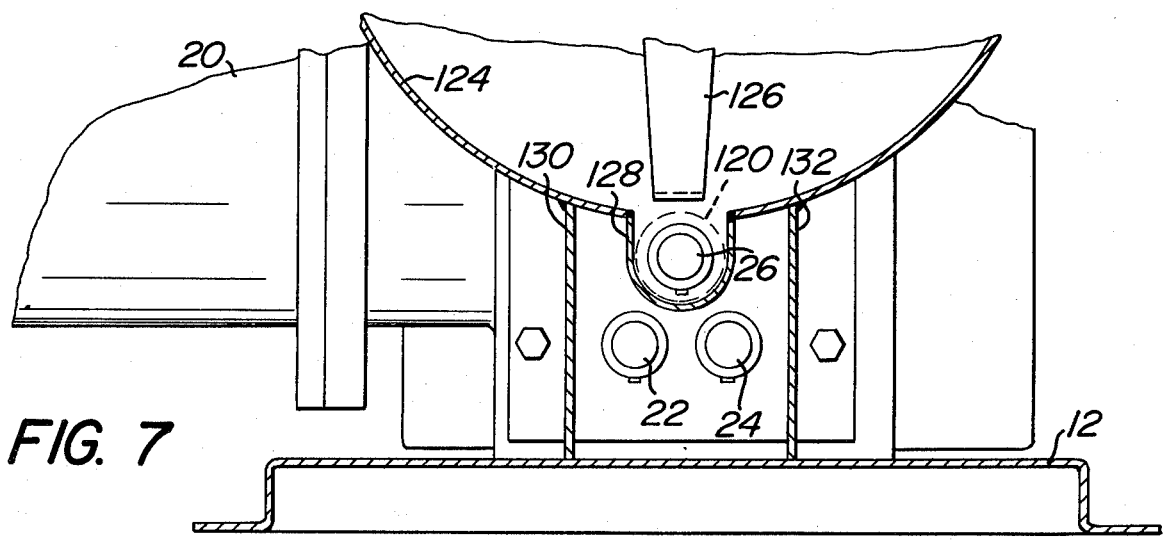
FIG. 7 is a partial transverse sectional view taken along the line 7—7 in FIG. 6.

Feeder hopper 124 is provided with a trough 128 which closely conforms to the outer circumference of the lands of screw 120 as best shown in FIG. 7. Moreover, feeder hopper 124 is shaped somewhat differently than feeder-hopper 40 and for this reason requires a different agitator 126. Feeder hopper 124 is also provided with downwardly extending walls 130 and 132 which function to cover screw drive shafts 22 and 24 when they are not in use.

Figure 8:
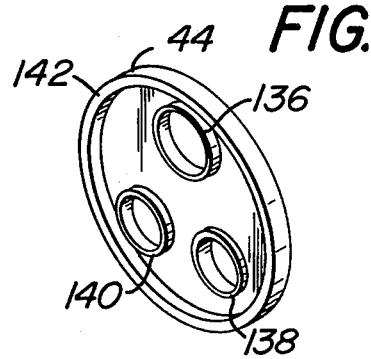
FIG. 8 is a perspective view of a seal with the output drive shafts in accordance with the present invention.
Figure 6:
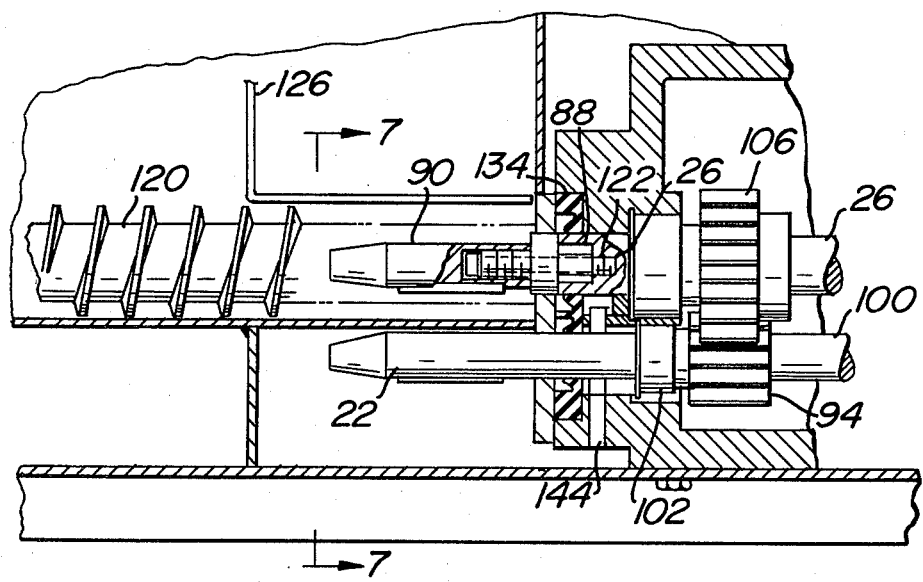
FIG. 6 is a partial transverse sectional view of the output drive and screw with the screw feeder set up with a single screw.

As best shown in FIGS. 2 and 6, the screw drive shafts for the twin screws 58 and 60 and for the single screw 120 are brought out through the wall 42 of the gear box 18 at a position that is closely adjacent to each other. This permits the efficient and relatively quick and easy interchange of hoppers and screws described above. This is accomplished without the necessity for making any change or modification in the gearing within the gear box 18. Another advantage is that a single seal 44 can be used for the purpose of preventing the backflow of material from the hopper into the gear box 18. The seal 44 is shown in perspective in FIG. 8. As shown, it includes three flexible lip rings 136, 138 and 140 which engage drive shafts 26, 24 and 22, respectively. An outer lip flange 142 provides for sealing engagement with the rearmost wall of the feeder-hopper 40 or the feeder hopper 124 as shown in FIGS. 2 and 6. The advantage of using a single seal is that it can be quickly removed and replaced and much less structure and manufacturing procedures are required than if individual seals were used for each of the screw drive shafts, 22, 24 and 26.

Notwithstanding the presence of the seal 44, some material will invariably leak through it. To avoid contamination of the bearings or entry into the gear box 18, an opening 144 is provided in the gear box 18 immediately behind the seal 44. Opening 144 permits any material which does leak through the seal to fall harmlessly through it and onto the base 12.

It should be apparent from the foregoing detailed description that the volumetric screw feeder 10 is exceptionally flexible in that it can handle a broad range of materials and flow rates through the use of either twin or single screws. The close interaction of the two screws is self-cleaning. Hard to flow materials that tend to collect on a single screw are peeled off by the reciprocal wiping action of the twin screws and conveyed continuously through the feeder port. Highly floodable materials which tend to fall through a single screw are fed accurately and reliably by the positive forcedisplacement action of the two intermeshed screws. The volumetric screw feeder 10 can feed either dry or sticky materials.

When used as a single screw feeder, any number of screws with varying diameters and pitches can be used to provide a broad range of flow rates. When used as a twin screw volumetric feeder, the feeder 10 can use twin screws having varying pitches.

The simple, modular design of the device allows for easy conversion between the single and twin screw configuration. It is a straightforward matter to remove the bolt that fixes the agitator, remove the clamps for the feeder-hopper, and exchange the screws, feeder-hopper and agitator.

The present invention may be embodied in other specific forms without departing from the spirit or essential attributes thereof and, accordingly, reference should be made to the appended claims, rather than to the foregoing specification as indicating the scope of the invention.

We claim:

1. A volumetric screw feeder useable with a multiplicity of interchangeable single screws, and a multiplicity of interchangeable sets of intermeshed multiple screws, which screw feeder can be converted to the desired single screw or multiple screw configuration with a minimum of disassembly and reassembly without varying the associated drive mechanism, including:
- only one motor means;
- a drive shaft for turning the single screw and a set of drive shafts for turning the intermeshed multiple screws;
- only one drive means for interconnecting said motor means and said drive shafts so that the drive shafts are powered by the motor means;
- said single screw drive shaft and said multiple screw drive shafts being positionable closely adjacent and one above the other so that whichever screw or set of screws is attached to the drive shafts such screw or set of screws is located in the same position on the screw feeder;
- the uppermost of said drive shafts being detachable when said lowermost drive shafts are being used;
- said screws being adapted to be attachable to and detachable from said drive shafts;
- a plurality of interchangeable feeder-hopper means for use with either a single screw or a set of multiple screws;
- each feeder-hopper means having a trough adapted for receiving its associated screw or screws;
- whereby said screw feeder can be used with either a single screw or a set of intermeshed multiple screws by attaching only the selected screw or screws and feeder-hopper means to the screw feeder.

2. A volumetric screw feeder in accordance with claim 1 wherein said screw drive shafts include a pair of side-by-side drive shafts for driving intermeshed twin screws, and a third drive shaft for driving a single screw.

3. A volumetric screw feeder in accordance with claim 2 including a single seal for the drive shafts for said three screws for preventing the backflow of material being fed from the feeder-hopper means into other operating parts of the screw feeder.

4. A volumetric screw feeder in accordance with claim 2 wherein the drive shafts for the twin screws are positioned closely adjacent to the lowermost portion of the feeder-hopper means so as to substantially completely empty the same.

5. A volumetric screw feeder in accordance with claim 1 wherein each interchangeable feeder-hopper means includes an agitator needing only one agitator drive shaft on said screw feeder to which each feeder-hopper agitator is interchangeably connectible.

6. A volumetric screw feeder useable with a multiplicity of interchangeable single screws, and a multiplicity of interchangeable sets of intermeshed twin screws, which screw feeder can be converted to the desired single screw or twin screw configuration with a minimum of disassembly and reassembly without varying the associated drive mechanism, including:
- only one motor means;
- a pair of side-by-side drive shafts for turning intermeshed twin screws, and a third drive shaft for turning a single screw;
- only one drive means for interconnecting said motor means and said drive shafts so that the drive shafts are powered by the motor means;
- said single screw drive shaft and said pair of multiple screw drive shafts being positionable closely adjacent to one another and the axis of said single screw drive shaft be parallel to and above the axis of said pair of drive shafts so that whichever screw or set of screws is attached to the drive shafts such screw or set of screws is located in approximately the same position on the screw feeder;
- said third drive shaft being detachable when said pair of drive shafts are being used;
- said screw or sets of screws being adapted to be attachable to and detachable from said drive shafts;
- a plurality of interchangeable feeder-hopper means for use with either a single screw or a set of multiple screws;
- each feeder-hopper means having a trough shaped for receiving its associated screw or screws;
- whereby said screw feeder can be used with either a single screw of a set of intermeshed multiple screws by attaching only the selected screw or set of screws and feeder-hopper means to the screw feeder.

* * * * *